United States Patent
Andersson et al.

(10) Patent No.: US 10,209,141 B2
(45) Date of Patent: Feb. 19, 2019

(54) DETERMINING THE DEGREE OF HEAT TREATMENT OF A LIQUID PRODUCT

(71) Applicant: TETRA LAVAL HOLDINGS & FINANCE S.A., Pully (SE)

(72) Inventors: Knut-Ove Andersson, Lund (SE); Roelf Postema, Hörby (NL)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 553 days.

(21) Appl. No.: 14/894,807

(22) PCT Filed: Sep. 16, 2013

(86) PCT No.: PCT/EP2013/069167
§ 371 (c)(1),
(2) Date: Nov. 30, 2015

(87) PCT Pub. No.: WO2014/191062
PCT Pub. Date: Dec. 4, 2014

(65) Prior Publication Data
US 2016/0103024 A1  Apr. 14, 2016

(30) Foreign Application Priority Data
May 31, 2013 (SE) ........................ 1350671

(51) Int. Cl.
*G01K 13/02* (2006.01)
*G01K 17/10* (2006.01)
(52) U.S. Cl.
CPC ............. *G01K 13/02* (2013.01); *G01K 17/10* (2013.01); *G01K 2013/026* (2013.01)

(58) Field of Classification Search
CPC .... A23V 2002/00; G01K 13/02; G01K 17/10; G01K 2013/026; G01N 2203/0222; G01N 3/18; G01N 3/54
See application file for complete search history.

(56) References Cited

U.S. PATENT DOCUMENTS 4,997,662 A * 3/1991 Lidman ................... A23C 3/033
426/231
5,130,148 A * 7/1992 Brown .................. A23C 19/045
426/34

(Continued)

FOREIGN PATENT DOCUMENTS

CN   2026102764 U  * 12/2012
DE   103 03 111 A1   8/2004
(Continued)

OTHER PUBLICATIONS

International Search Report (PCT/ISA/210) dated Jun. 6, 2014, by the Japanese Patent Office as the International Searching Authority for International Application No. PCT/EP2013/069167.

*Primary Examiner* — Gail Kaplan Verbitsky
(74) *Attorney, Agent, or Firm* — Buchanan Ingersoll & Rooney PC

(57) ABSTRACT

A method for determining the degree of heat treatment of a liquid product in a liquid product processing system involves measuring at least a first value representing the temperature of the liquid product within a first time period; measuring at least a second value representing the flow of the liquid product within the first time period; and calculating at least a first heat treatment index value based on the first and second values, wherein the heat treatment index value is associated with a current degree of heat treatment of the liquid product.

22 Claims, 3 Drawing Sheets

(56) References Cited

U.S. PATENT DOCUMENTS

| | | | | |
|---|---|---|---|---|
| 6,881,251 B2* | 4/2005 | Taniguchi | ............... | C09C 1/48 |
| | | | | 106/31.6 |
| 7,213,967 B2* | 5/2007 | Simunovic | ............ | G01K 1/022 |
| | | | | 374/102 |
| 8,062,687 B2* | 11/2011 | Carroll | ................ | A01N 63/02 |
| | | | | 426/580 |
| 2008/0241354 A1* | 10/2008 | Winter | ............... | F27B 17/0025 |
| | | | | 427/8 |
| 2011/0320060 A1 | 12/2011 | Batmaz et al. | | |
| 2012/0015088 A1* | 1/2012 | Runge | ..................... | A23L 2/46 |
| | | | | 426/511 |
| 2015/0079527 A1* | 3/2015 | Takahashi | ............... | C21D 1/76 |
| | | | | 432/1 |

FOREIGN PATENT DOCUMENTS

| | | | | | |
|---|---|---|---|---|---|
| EP | 1 106 083 A1 | | 6/2001 | | |
| EP | 2 400 282 A2 | | 12/2011 | | |
| GB | 519871 A | * | 4/1940 | ............ | C10G 9/206 |
| GB | 675762 A | * | 7/1952 | ............... | A23L 3/22 |
| JP | 02002033254 A | * | 1/2002 | | |

\* cited by examiner

DETERMINING THE DEGREE OF HEAT TREATMENT OF A LIQUID PRODUCT

TECHNICAL FIELD

The present invention relates to a method for determining the degree of heat treatment of a liquid product in a liquid product processing system. More particularly, the present invention relates to a method and system for real-time monitoring of the heat treatment process of liquid products.

BACKGROUND

In modern liquid processing systems heat treatment is often desirable for making the final product stable during subsequent processing and storage. Such heat treatment, i.e. pasteurization, is normally performed by heating the liquid product to an elevated temperature, which temperature is sufficient to at least prevent microbial growth in the liquid product, as well as keeping the liquid product at that particular temperature for a specific period of time before the liquid product is cooled.

In liquid food processing it is a well known fact that excessive heat load on the food product should be avoided, since heat treatment of the food product may affect the food product negatively, e.g. by causing losses in vitamin and mineral content. At the same time it is critical to ensure sufficient heat load for not jeopardizing food safety. Therefore it is of major importance to control the heating as well as the subsequent cooling of the food product during such heat treatment.

Therefore, it has been suggested to continuously monitor the pasteurization process with respect to the temperature of the liquid product. By fetching real-time values of this parameter the quality of the current pasteurization process may be determined and analysed for ensuring the desired degree of pasteurization.

It has also been suggested to continuously monitor the pasteurization process with respect to the heating time of the liquid product. By fetching real-time values of this parameter the quality of the current pasteurization process may be determined and analysed for ensuring the desired degree of pasteurization.

Since pasteurization is very energy consuming it would be advantageous to reduce the pasteurization temperature and/or pasteurization time. However, in e.g. food processing industry food safety is a major concern why such reduction in temperature may never be allowed if the quality of the food product is at risk.

Therefore, there is a need for an improved pasteurization system allowing for such reduction in temperature and/or time without jeopardizing the quality of the liquid product.

SUMMARY

It is, therefore, an object of the present invention to overcome or alleviate the above described problems.

The basic idea is to provide a heat treatment system, in which a plurality of sensors is used to monitor a single heat treatment index value for the liquid product being processed by said system.

It has been shown that by improving the monitoring of the heat treatment process more accurately, it is possible to actually reduce the heat treatment temperature and/or time without jeopardizing the quality of the liquid product. It can thus be assumed that previous recommendations and standards setting required heat treatment temperatures and times have been excessive, as prior art monitoring systems have not been sufficiently reliable.

Throughout this description, the term "heat treatment" should be interpreted broadly to cover all heating processes of liquid products, which heating processes at least prevents microbial growth in the liquid product, such as pasteurization, sterilization, etc.

According to a first aspect of the invention a method for determining the degree of heat treatment of a liquid product in a liquid product processing system is provided. The method comprises the steps of measuring at least a first value representing the temperature of the liquid product within a first time period; measuring at least a second value representing the flow of the liquid product within the first time period; and calculating at least a first heat treatment index value based on said first and second values, wherein said heat treatment index value is associated with a current degree of heat treatment of the liquid product.

The method may further comprise the step of comparing the at least one heat treatment index value with a heat treatment reference value, and based on said comparison calculating a value representing a momentary degree of heat treatment of the liquid product for the first time period in view of the heat treatment reference value.

The steps of measuring at least a first value, measuring at least a second value, and calculating at least a first heat treatment index value, may be performed continuously in real time or at regular predetermined intervals, thereby resulting in a set of first values, a set of second values, and a set of first heat treatment index values.

The method may further comprise the step of calculating an accumulated degree of heat treatment of the liquid product by integration or summation of at least a first calculated heat treatment index value and a second calculated heat treatment index value over time.

At least one of the at least one first value and at least one of the at least one second value may be measured in a heat treatment unit by means of at least one sensor unit.

A first sensor unit may be positioned in at least a first section of the heat treatment unit and a second sensor unit may be positioned in at least a second section of the heat treatment unit.

Said accumulated degree of heat treatment may be calculated by integrating or summation of a first heat treatment index value measured at said first section, and a second heat treatment index value measured at said second section.

Said first heat treatment index value may be calculated at a first time, and said second heat treatment index value may be calculated at a second time, wherein the time difference between said first time and said second time corresponds to the time for a specific amount of liquid product to flow from said first section to said second section.

A step of performing a second measurement of a first value and second value may be executed during a second time period being determined by the measured second value for the first time period and a downstream position at which the second measurement is conducted.

At least one first heat treatment index value may further be calculated based on the pH value of the liquid product.

The at least one first heat treatment index value may further be calculated based on a parameter representing the interior contact surface of a heat treatment unit, through which the liquid products is flowing, per unit volume of liquid product.

The at least one first heat treatment index value (PIV) may be calculated based on the formula:

$$PIV(t) = t \cdot 10 \cdot \frac{(T - T_{ref})}{z},$$

where t is the time in minutes, T is the current temperature of the liquid product, $T_{ref}$ is the required maximum temperature, such as the required pasteurization temperature, and z is a liquid product constant. Preferably, t is a function of flow and the volume of the particular heat treatment unit segment, and it may also be a function of the interior processing unit contact surface per volume unit of the liquid product. In an embodiment, z may be a liquid product constant being dependent on the actual pH of the liquid product.

An accumulated degree of heat treatment index value may be calculated as:

$$PIV_{Acc.} = \Sigma_{t=1}^{n} PIV(t)$$

The at least one first heat treatment index value may further be calculated based on the flow profile of the liquid product in a heat treatment unit of the processing system, through which the liquid products is flowing.

The heat treatment unit may be a heat treatment device, such as a heater or heat exchanger, or a holding cell.

The method may further comprise the step of changing the required heat treatment temperature upon detection of a change of flow between at least two second values.

The method may further comprise the step of sending an alarm signal in the event of at least one calculated or accumulated heat treatment index value is determined as not being food safe.

According to a second aspect, a system for determining the degree of heat treatment of a liquid product in a liquid product processing system is provided. The system comprises a first sensor unit for measuring at least a first value representing the temperature of the liquid product within a first time period; a second sensor unit for measuring at least a second value representing the flow of the liquid product within the first time period; and a control unit being configured to calculate at least a first heat treatment index value based on said first and second values, wherein said heat treatment index value is associated with a degree of heat treatment of the liquid product.

The system may further comprise a first sensor unit and second sensor unit pair being positioned in at least a first section of a heat treatment unit of the processing unit through which the liquid products is flowing, and another first sensor unit and second sensor unit pair being positioned in at least a second section of the heat treatment unit.

The heat treatment unit may be a heat treatment device, such as a heater or heat exchanger, or a holding cell.

According to a third aspect a liquid food product is provided, wherein the liquid food product is manufactured by the method according to the first aspect.

According to a fourth aspect, a control unit is provided, wherein the control unit is configured to perform the method steps of the first aspect.

According to a fifth aspect, a computer-readable medium having embodied thereon a computer program for processing by a processor is provided. The computer program comprises code segments arranged, when run by an apparatus having computer-processing properties, for performing all of the steps of the method according to the first aspect.

BRIEF DESCRIPTION OF DRAWINGS

The above, as well as additional objects, features, and advantages of the present invention, will be better understood through the following illustrative and non-limiting detailed description of preferred embodiments of the present invention, with reference to the appended drawings, wherein.

DETAILED DESCRIPTION

Figure 1:
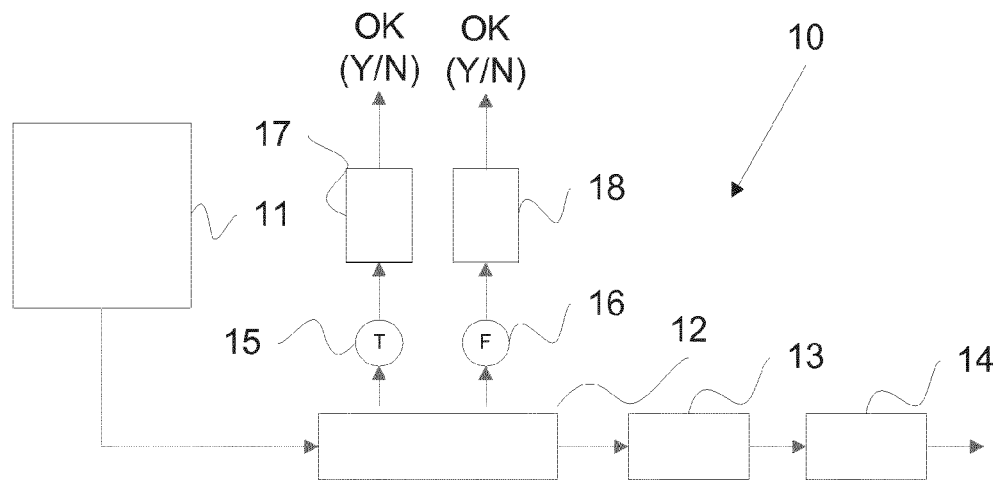
FIG. 1 is a schematic view of a prior art pasteurization system.

Starting with FIG. 1 a prior art pasteurization system 10 is shown. The system 10 includes a batch tank 11 enclosing a certain amount of liquid product to be heated. Upon heating, the liquid product is transported through a heat exchanger 12 wherein the temperature of the liquid product is elevated to a predetermined pasteurization temperature. The liquid product is thereafter kept at the elevated temperature during transportation through a holding cell 13 for ensuring the desired pasteurization. After pasteurization is completed, the liquid product is typically transported through a further heat exchanger 14 for cooling down the liquid product. During heating, a temperature sensor 15 provides a measurement signal representing the current temperature of the liquid product. Additionally, a flow meter 16 provides a measurement signal representing the current flow of the liquid product. The measured temperature is compared with a reference value in a control unit 17 for determining if the actual liquid product temperature is within an allowed pasteurization temperature interval. Correspondingly, the measured flow is compared with a reference value in a control unit 18 for determining if the actual liquid product flow is within an allowed pasteurization temperature interval.

Figure 2:
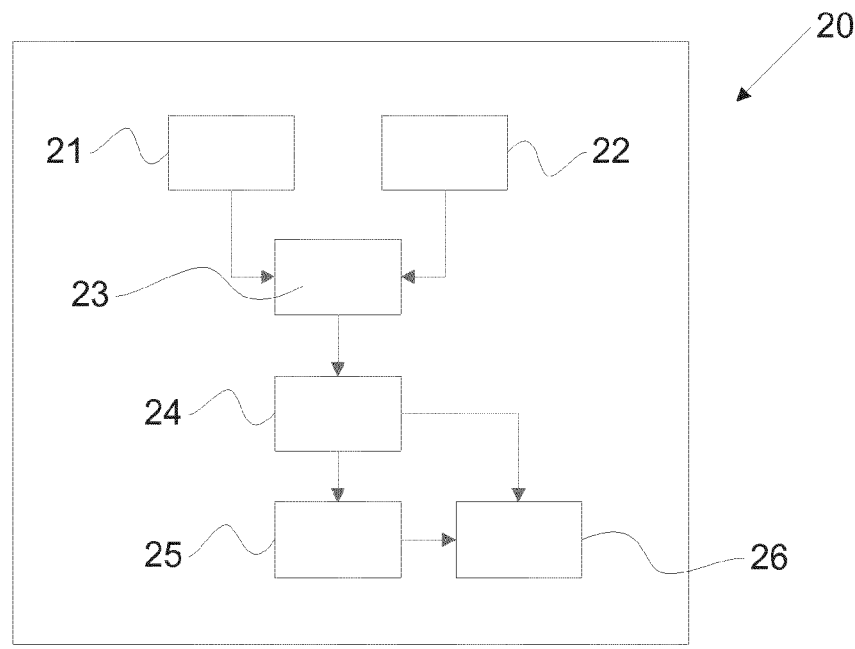
FIG. 2 is a flow chart of a method according to an embodiment.

FIG. 2 illustrates a flow chart of a method 20 of determining the degree of heat treatment of a liquid product in a liquid product processing system according to an embodiment. The method comprises the step of measuring 21 at least a first real-time value representing the temperature of the liquid product within a first time period. The method further comprises the step of measuring 22 at least a second real-time value representing the flow of the liquid product within the first time period. The method is characterized by the step of calculating 23 at least a first heat treatment index value based on said first and second real-time values, wherein said heat treatment index value is associated with a current degree of heat treatment of the liquid product.

An object of utilizing a heat treatment index value is to replace the individual values of the temp and flow etc, which can be confusing for the operators, as usually numerous flow meters and temperature sensors are provided along the liquid processing system. A further technical effect of the heat treatment index value is that it allows for a lowering of the heat treatment temperature, which normally is set based on a rather large margin of error. The margin of error takes into account position errors of the sensing units, sensor unit deviations, etc. For example, when the liquid product is a beverage it is crucial that the final pasteurized liquid product is fully suitable for drinking, leaving no risk for microbiological growth. Thus, it is therefore common to heat treating the liquid product at a higher temperature than necessary just to make sure that the end product does not contain any unsuitable or unhealthy amounts of microorganisms, e.g. during pasteurization.

Each calculated heat treatment value may be compared 24 to a heat treatment reference value in order to calculate 25 a value representing a momentary degree of heat treatment of the liquid product for the first time period in view of the heat treatment reference value.

The measurements of the first real-time values and the measurements of the second real-time values as well as the calculations of the first heat treatment index values may be conducted on a continuous basis or at regular predetermined intervals. This results in a set of first real-time values, a set of second real-time values, and a set of first heat treatment index values.

In addition to, or as an alternative to the calculated momentary degree of heat treatment a value representing an accumulated degree of heat treatment of the liquid product may be calculated 26 by performing an integration or summation of at least a first calculated heat treatment index value and a second calculated heat treatment index value over time.

An alternative value representing an accumulated degree of heat treatment of the liquid product may be calculated 26 as a summation of a number values each representing a momentary degree of heat treatment.

Figure 3:
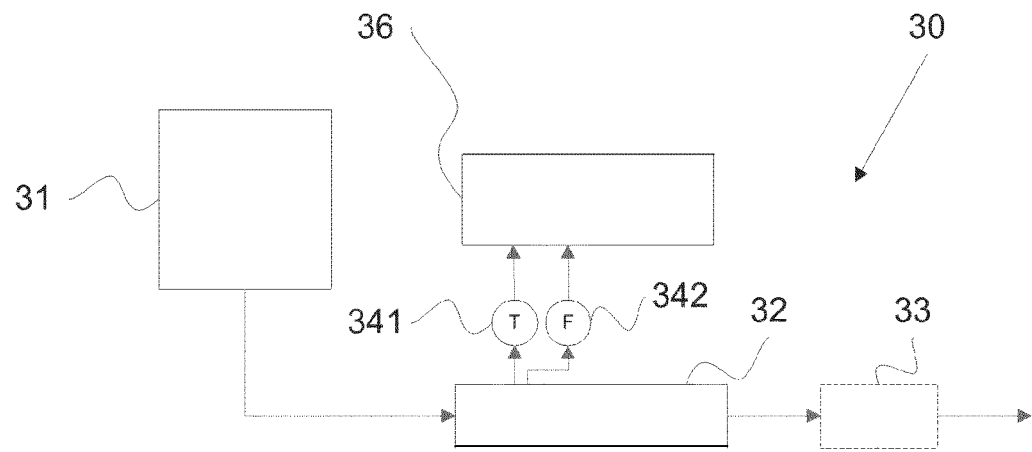
FIG. 3 is a schematic view of a heat treatment system according to an embodiment.

In order to improve the described system of FIG. 1, an embodiment of a system 30 for controlling the degree of heat treatment of a liquid product is shown in FIG. 3. The system 30 is advantageous for a wide range of liquid products, such as liquid food, pharmaceuticals, cosmetics, etc for which temperature control is critical. As is shown in FIG. 3 a liquid product supply 31 is provided. The liquid product supply 31 may e.g. be a batch tank, or e.g. upstream liquid product processing equipment capable of supplying a flow of liquid product.

The system includes a heat treatment device 32, such as a heat exchanger 32, and optionally a holding cell 33 arranged in series such that the elevated temperature may be maintained for a predetermined time. The heat treatment device 32 and the holding cell 33 may be provided as one single device. Further, the heat exchanger 32 may be replaced by other heating devices, such as an ohmic heater or a microwave heater or other heating devices, as long as the heating device allows for heating a liquid product to an elevated temperature, such as from 10° C. up to 100° C. in a fairly rapid manner.

The heat treatment device 32 may also be referred to as a heat treatment unit throughout this specification.

The heat treatment device 32 may preferably be configured for a liquid food product, such as a juice or similar low acid beverage. In case of orange juice the current standard temperature for pasteurization is 95° C., while the holding cell 33 is configured to maintain the elevated temperature for approximately 15 s. However, as will be explained throughout this specification, it has been shown that embodiments of the system 30 will allow a decrease in temperature to 80° C., without increasing the heat treatment time significantly. Hence, the present system and method allows for a significant reduction in energy consumption.

The system 30 further comprises a control unit 36 for implementing control schemes to various components of the system 30. For example, the control unit 36 is configured to control the operating parameters of the heat treatment device 32 such that the heating parameters (e.g. maximum temperature, temperature gradient, holding time, flow, pressure, etc) may be adjusted in accordance with required parameters for each specific liquid product.

Upon heating, the liquid product is transported from the liquid product supply 31 through the heat treatment device 32 wherein the temperature of the liquid product is elevated to a predetermined heat treatment temperature. The liquid product is thereafter kept at the elevated temperature for a predetermined time for ensuring the desired heat treatment, e.g. during transportation through a holding cell 33.

The system 30 further comprises a first sensor unit 341 for measuring a first real-time value representing the temperature of the liquid product flowing through the heat treatment device 32.

Furthermore, the system 30 comprises a second sensor unit 342 for measuring a second real-time value representing the flow of the liquid product flowing through the heat treatment device 32.

The first and second sensor units may be any publicly available sensor units suitable for measuring temperature and flow, respectively, in a liquid product processing system.

The first sensor unit 341 and the second sensor unit 342 are operatively connected to the control unit 36. The control unit is configured to calculate at least a first heat treatment index value based on the first and second real-time values. The heat treatment index value is associated with a degree of heat treatment of the liquid product. The control unit 36 is further capable of comparing the current degree of heat treatment with a reference value. Should the current degree of heat treatment fall outside an accepted interval, the control unit 36 may be configured to initiate an alarm to an operator. In another embodiment, the control unit 36 may be configured to change the operating parameters of the system for increasing or decreasing the flow or temperature, thus regulating the system 30 such that the current heat treatment index value may return to an accepted value.

In an embodiment, the heat treatment index value (PIV) is calculated based on the following formula:

$$PIV(t) = t \cdot 10 \cdot \frac{(T - T_{ref})}{z},$$

where t is the time in minutes, T is the current temperature of the liquid product, $T_{ref}$ is the required maximum temperature, such as the required pasteurization temperature, and z is a liquid product constant. Preferably, t is a function of flow and the volume of the particular heat treatment unit segment, and it may also be a function of the interior processing unit contact surface per volume unit of the liquid product. In an embodiment, z may be a liquid product constant being dependent on the actual pH of the liquid product.

It may be observed from the formula that for a constant PIV and constant pH and interior contact surface/unit volume decreasing the flow would decrease the required heat load. Conversely, using a higher heat load a higher flow may be used to adequately heat treat the liquid product. The heat treatment index value may thus be seen as representing the heat load to which the liquid product is exposed, and it is readily understandable that several different formulas may be used to formulate such representation.

Increasing the pH may require a higher temperature, and vice versa. Furthermore, the larger interior contact surface per unit volume of liquid product the lower the required heat treatment temperature.

Figure 4:
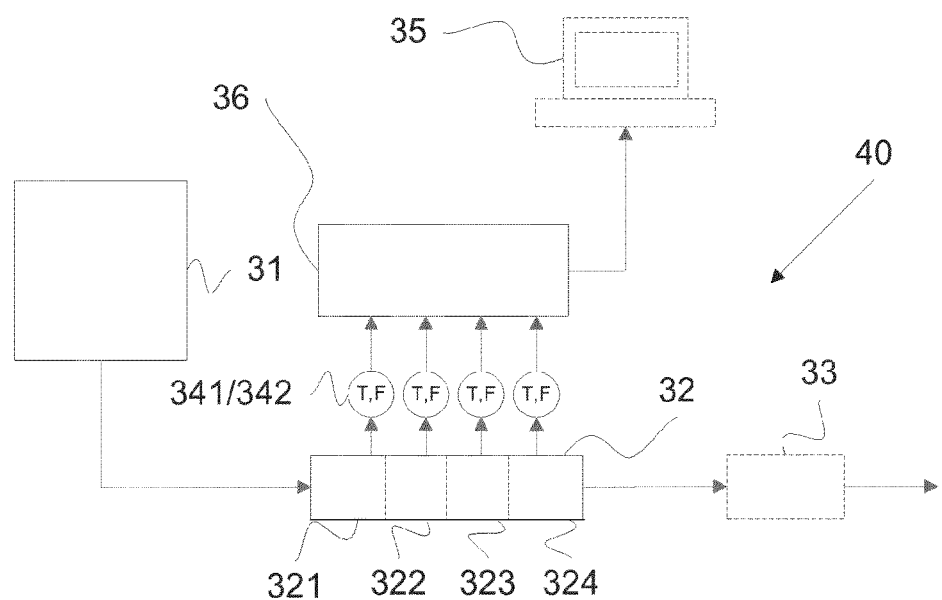
FIG. 4 is a schematic view of a heat treatment system according to an embodiment.

FIG. 4 illustrates a system 40 according to another embodiment. In addition to the system 30 of FIG. 3, in this particular embodiment a series of first and second sensor unit pairs 341,342 are arranged and respectively connected to different sections 321, 322, 323, 324 of the heat treatment device 32. This allows for improved control of the temperature and the flow in different parts 321, 322, 323, 324 of the heat treatment device 32. For a given time period, the control unit 36 is configured to calculate a heat treatment index value for each section of the heat treatment device. This is particularly advantageous for heat treatment devices 32 comprising tubular heat exchangers, such that each section 321, 322, 323, 324 may represent specific tube sections.

In FIG. 4 it may be observed that the control unit may be operatively connected to a display device for presenting the calculated heat treatment index values, values for momentary degree of heat treatment, and values for accumulated degree of heat treatment to an operator for monitoring. In this embodiment, the accumulated degree of heat treatment may thus be calculated by adding or integrate the respective heat treatment index value for each section. In case of frequent flow variations, the accumulated degree of heat treatment may be calculated by adding or integrate PIV (section n, time t) to PIV(section n−1, time t-y) to PIV (section n−2, time t-2y) etc., where n is the index for the last section, and y is the time for the liquid product to flow from one section to the next.

Figure 5:
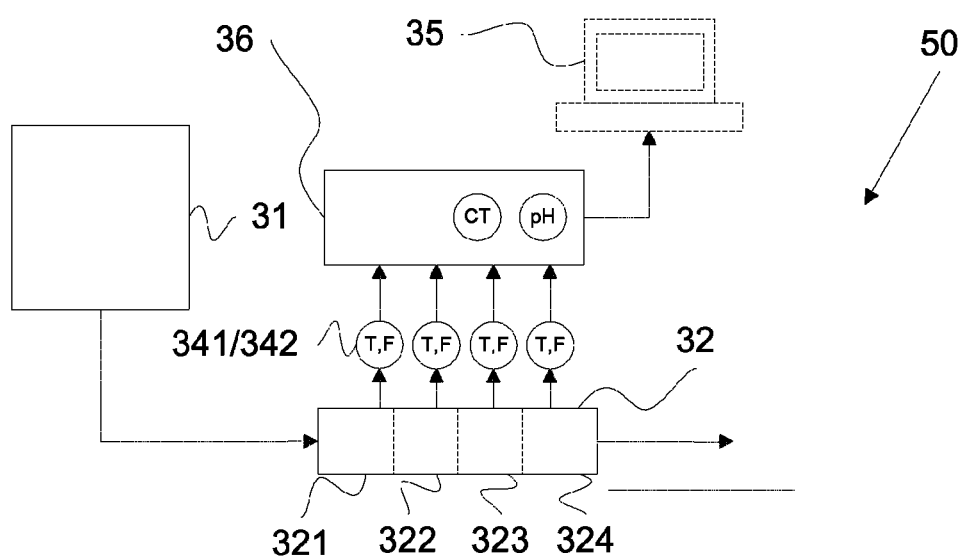
FIG. 5 is a schematic view of a heat treatment system according to an embodiment.

FIG. 5 illustrates a system 50 according to another embodiment. In addition to the system 40 of FIG. 4, in this particular embodiment the control unit 36 has access to the ph and CT parameters as being used in the previously given formula for calculation of the heat treatment index values.

In an embodiment, the heat treatment index value may be calculated by taking into account the flow profile of the liquid product in the heat treatment device 32 of the processing system. Improved circulation may allow for a reduction of the required heat treatment temperature while a lower circulation may allow for an increase of the required heat treatment temperature. The flow profile parameter may be accounted for in the constant $k_5$ of the formula.

In addition or as an alternative to the sensor unit for measuring temperature and flow, a sensor unit configured to measure the pH of the liquid product may be provided.

The control unit 36 may be configured to control the time at which the operatively connected sensor units 341, 342 should measure their respective parameter. Hence, a two-way communication may be established between the control unit 36 and the sensor units 341, 342.

The heat treatment reference values may be stored onto a memory of the control unit 36 or be accessible remotely, e.g. via a telecommunication protocol, Internet, Ethernet, Bluetooth, or any other wired or wireless communication protocol. Hence, the control unit 36 may access the reference heat treatment values from a remote source, such as a central server.

In an embodiment, a liquid food product manufactured using the method according to any of the previously explained embodiments is provided.

In an embodiment, a non-transitory computer-readable medium having embodied thereon a computer program for processing by a processor is provided. The computer program comprises code segments arranged, when run by an apparatus having computer-processing properties, for performing all of the steps of the method according to any of the embodiments disclosed herein.

Although the embodiments herein are based on calculating a heat treatment index value, it should be appreciated that the same methodology could be used to determine an index for the degree of reduction of microorganisms in other liquid processing equipment, such as filters and/or bactofuges. In such applications, instead or in addition other parameters than the temperature and flow could be accounted for, such as filter specifications etc. As a general aspect a method for determining the degree of treatment of a liquid product in a liquid product processing system is provided. The method comprises the steps of measuring at least a first value representing a first treatment parameter of the liquid product within a first time period, measuring at least a second value representing a second treatment parameter of the liquid product within the first time period, and calculating at least a first treatment index value based on said first and second values, wherein said treatment index value is associated with a current degree of treatment of the liquid product. In case of a filter, such treatment parameters may e.g. be flow and pressure drop.

Although the above description has been made mostly with reference to a liquid food processing system, it should be readily understood that the general principle is applicable for various different liquid processing systems.

Further, the invention has mainly been described with reference to a few embodiments. However, as is readily understood by a person skilled in the art, other embodiments than the ones disclosed above are equally possible within the scope of the invention, as defined by the appended claims.

The invention claimed is:

1. A method for determining a heat treatment index value for a liquid product in a liquid product processing system, the method comprising:
    measuring at least a first value representing the temperature of the liquid product within a first time period;
    measuring at least a second value representing the flow of the liquid product within the first time period;
    calculating at least a first heat treatment index value for the liquid product based on said first and second values and a predetermined pH value of the liquid product, wherein said heat treatment index value is associated with a current degree of heat treatment of the liquid product; and
    presenting the calculated first heat treatment index value to an operator of the liquid product processing system for monitoring.

2. The method of claim 1, further comprising
    comparing the at least one heat treatment index value with a predetermined heat treatment reference value, and based on said comparison
    calculating a value representing a momentary degree of heat treatment of the liquid product for the first time period in view of the heat treatment reference value.

3. The method of claim 1, wherein the measuring of the at least first value, the measuring of the at least second value, and the calculating of the at least first heat treatment index value are performed continuously or at regular predetermined intervals, thereby resulting in a set of first values, a set of second values, and a set of first heat treatment index values.

4. The method of claim 1, further comprising calculating an accumulated degree of heat treatment of the liquid product by integration or summation of at least the first calculated heat treatment index value and a second calculated heat treatment index value over time.

5. The method according to claim 1, wherein at least one of the at least one first value and at least one of the at least one second value are measured in a heat treatment unit by at least one sensor unit.

6. The method according to claim 5, wherein a first sensor unit is positioned in at least a first section of the heat treatment unit and a second sensor unit is positioned in at least a second section of the heat treatment unit that is different from the first section of the heat treatment unit, the first sensor unit and the second sensor unit measuring at least one of a temperature and a flow rate of the liquid product.

7. The method according to claim 4, wherein said accumulated degree of heat treatment is calculated by integrating or summation of a first heat treatment index value measured at said first section, and a second heat treatment index value measured at said second section.

8. The method according to claim 7, wherein said first heat treatment index value is calculated at a first time, and said second heat treatment index value is calculated at a second time, and wherein a time difference between said first time and said second time corresponds to the time for a predetermined amount of liquid product to flow from said first section to said second section.

9. The method according to claim 8, further comprising performing a second measurement of a first value and second value during a second time period being determined by the measured second value for the first time period and a downstream position at which the second measurement is conducted.

10. The method according to claim 1, further comprising sending an alarm signal whenever at least one calculated or accumulated heat treatment index value is determined as not being food safe.

11. The method according to claim 1, wherein the at least one first heat treatment index value is further calculated based on a predetermined parameter representing an interior contact surface of a heat treatment unit, through which the liquid products is flowing, per unit volume of liquid product.

12. The method according to claim 1, wherein the at least one first heat treatment index value is calculated based on the formula:

$$PIV(t) = t \cdot 10 \cdot \frac{(T - T_{ref})}{z},$$

where
t is the time in minutes, T is the current temperature of the liquid product, $T_{ref}$ is the required maximum temperature, and z is a liquid product constant.

13. The method according to claim 12, further comprising calculating an accumulated degree of heat treatment index value as:

$$PIV_{Acc.} = \Sigma_{t=1}^{n} PIV(t).$$

14. The method according to claim 1, further comprising measuring a flow profile of the liquid product in a heat treatment unit of the liquid product processing system, wherein the at least one first heat treatment index value is further calculated based on the flow profile of the liquid product in the heat treatment unit of the processing system, through which the liquid products is flowing.

15. The method according to claim 5, wherein the heat treatment unit is a heat treatment device that is one of a heater or heat exchanger, or a holding cell.

16. The method according to claim 1, further comprising measuring a further second value representing the flow of the liquid product within the first time period and changing a required heat treatment temperature upon detection of a change of flow between at least the two second values.

17. A system for controlling the degree of heat treatment of a liquid product in a liquid product processing system, comprising:
a first sensor unit for measuring at least a first value representing the temperature of the liquid product within a first time period;
a second sensor unit for measuring at least a second value representing the flow of the liquid product within the first time period; and
control unit being configured to calculate at least a first heat treatment index value for the liquid product based on said first and second values and on a predetermined pH value of the liquid product, wherein said heat treatment index value is associated with a degree of heat treatment of the liquid product, the control unit controlling operating parameters of the liquid product processing system based upon at least the first heat treatment index value.

18. The system according to claim 17, comprising
the first sensor unit and the second sensor unit defining a first sensor pair positioned in at least a first section of a heat treatment unit of the processing unit through which the liquid products is flowing, and further comprising
another first sensor unit and another second sensor unit defining a second sensor pair positioned in at least a second section of the heat treatment unit.

19. The system according to claim 15, wherein the heat treatment unit is a heat treatment device that is one of a heater or heat exchanger, or a holding cell.

20. A liquid food product manufactured using the method according to claim 1 for determining the degree of a heat treatment index value for the liquid product.

21. A control unit configured to perform the method of claim 1.

22. A non-transitory computer-readable medium having embodied thereon a computer program for processing by a processor, the computer program comprising code segments arranged, when run by an apparatus having computer-processing properties, for performing all of the steps of the method according to claim 1.

* * * * *